(12) United States Patent
McGregor

(10) Patent No.: US 6,889,631 B2
(45) Date of Patent: May 10, 2005

(54) ANIMAL PEN FLOORING SYSTEM

(75) Inventor: Michael A. McGregor, Carrollton, TX (US)

(73) Assignee: Southwest Agri-Plastics, Inc., Addison, TX (US)

( * ) Notice: Subject to any disclaimer, the term of this patent is extended or adjusted under 35 U.S.C. 154(b) by 0 days.

(21) Appl. No.: 10/465,127

(22) Filed: Jun. 19, 2003

(65) Prior Publication Data

US 2004/0255870 A1 Dec. 23, 2004

(51) Int. Cl.⁷ .............................. A01K 1/00; A01K 1/01
(52) U.S. Cl. ...................................... 119/528; 119/529
(58) Field of Search ............................ 119/528, 529, 119/525, 527

(56) References Cited

U.S. PATENT DOCUMENTS

| | | | | |
|---|---|---|---|---|
| 4,329,939 A | * | 5/1982 | Christie et al. ............. | 119/528 |
| D266,610 S | | 10/1982 | Bartscher | |
| 4,845,907 A | | 7/1989 | Meek | |
| 4,953,501 A | | 9/1990 | Moreau | |
| D336,349 S | | 6/1993 | Moreau | |
| 5,687,534 A | * | 11/1997 | Kongsgaard et al. ........ | 119/528 |
| D397,457 S | | 8/1998 | Hutchings | |
| 5,813,365 A | * | 9/1998 | Helmy ........................ | 119/528 |
| 5,855,188 A | | 1/1999 | Kongsgaard et al. | |
| 5,862,779 A | * | 1/1999 | Kleinsasser ................. | 119/529 |
| 5,937,793 A | * | 8/1999 | Church ....................... | 119/528 |
| 6,047,663 A | * | 4/2000 | Moreau et al. ............. | 119/529 |

* cited by examiner

*Primary Examiner*—Michael J. Carone
*Assistant Examiner*—Elizabeth Shaw
(74) *Attorney, Agent, or Firm*—Gardere Wynne Sewell LLP

(57) ABSTRACT

An animal confinement pen flooring system, particularly adapted for swine farrowing operations, includes at least first and third rows of spaced-apart molded plastic foraminous flooring panels and an intermediate row of cast iron foraminous flooring panels, all of the panels being supported on spaced-apart elongated support rails in a stand off position above a subfloor. The plastic and cast iron panels each include opposed sets of hooked-shaped flanges for engagement with support rails, respectively, for supporting the panels thereon. The cast iron panels each include a boss and an opposed recess disposed on opposite sides thereof for interconnecting adjacent panels by cooperating hook portions formed on the boss and in the recess of the adjacent panel, respectively. The combination of the cast iron and molded plastic flooring panels provides enhanced comfort for swine in farrowing operations.

8 Claims, 5 Drawing Sheets

ANIMAL PEN FLOORING SYSTEM

BACKGROUND OF THE INVENTION

Animal confinement pens, particularly pens for confining sows and piglets in swine farrowing houses present certain problems with respect to the flooring systems for use in such pens. For example, the flooring systems are preferably supported in a standoff position with respect to a subfloor so that animal wastes may be removed from the confinement pens by way of the space between the raised flooring and subflooring therebelow. Raised flooring systems may be characterized by elongated spaced-apart support rails and removable foraminous flooring panels supported thereby. The construction of farrowing pen flooring panels is preferably of thermoplastic covering at least a portion of the confinement pen. However, the weight of the sow is such that conventional plastic flooring panels do not provide adequate support. Moreover, it has been determined that the sow prefers to reside on a cast iron or similar metallic panel which is of adequate strength but which also provides for a heating and cooling effect preferred by the sow. On the other hand the infant pigs prefer the more constant temperature and smoothness of molded plastic flooring and do not require the extra strength provided by cast iron, steel or other suitable metals which may be used for flooring panels.

Continuing improvements have been desired in animal pen flooring systems of the general type described herein. The present invention overcomes certain disadvantages in prior art flooring systems and provides an improved flooring system which utilizes both molded plastic and cast iron or other metal panels which are secured to each other and to spaced apart support rails in an improved manner.

SUMMARY OF THE INVENTION

The present invention provides an improved flooring system, particularly useful for animal confinement pens and more particularly useful for confinement pens used in swine farrowing operations.

In accordance with one aspect of the present invention, a flooring system is provided wherein spaced-apart elongated support rails are adapted to support spaced-apart rows of molded plastic flooring panels between which is disposed a row of cast iron or similar metal flooring panels. Both types of flooring panels are provided with elongated hook-like support flanges which are interleaved with each other and which engage upstanding elongated support rails to support the flooring in a standoff position from a subfloor to facilitate animal waste disposal.

An improved arrangement in accordance with the present invention is one wherein an elongated set of cast iron or similar metal panels are interlocked with each other and supported by spaced-apart support rails. The metal panels are configured to be interleaved with opposed sets of molded plastic flooring panels which are also partially supported by the same pair of support rails which support the metal panels and are further supported by a second set of spaced apart elongated support rails disposed outboard of the first mentioned set of rails.

The present invention further provides an improved animal confinement pen flooring system wherein the center set of flooring panels is provided by separate panels which are supported on the aforementioned support rails but which are also interlocked with each other to form a more rigid flooring system. The center panels are each provided with an integrally formed laterally projecting tongue and hook part on one side of the panel and the adjacent panel is provided with a recess and cooperating hook part on an opposite side of the panel. Each center panel may be identical or one or more of the center panels may be of different widths to provide the required overall dimension of the confinement pen.

Those skilled in the art will further appreciate the above-mentioned advantages and superior features of the invention together with other important aspects thereof upon reading the detailed description which follows in conjunction with the drawings.

DETAILED DESCRIPTION OF A PREFERRED EMBODIMENT

Figure 1:
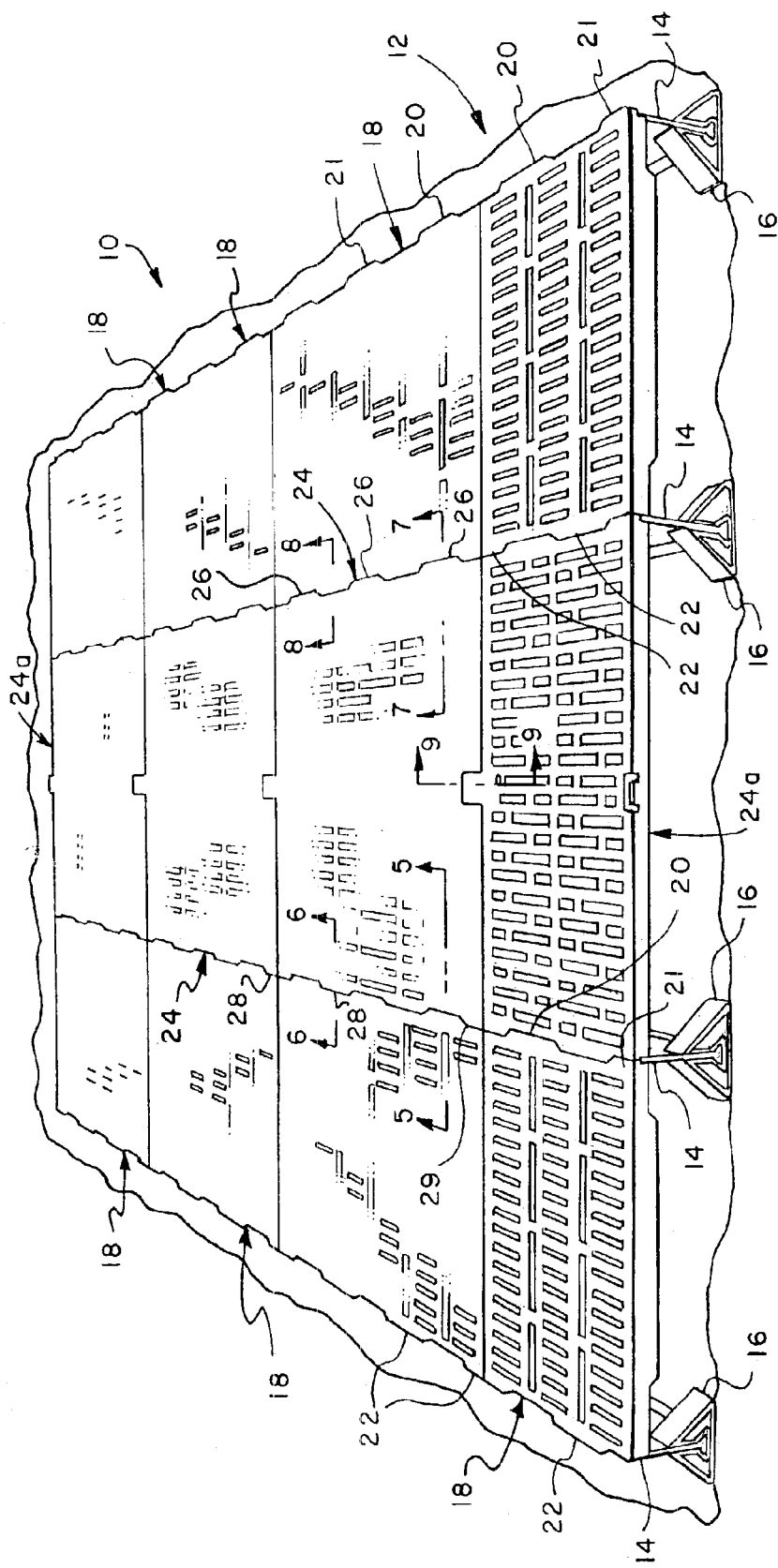
FIG. 1 is a perspective view of an animal confinement pen flooring system in accordance with the present invention.

In the description which follows, like parts are marked throughout the specification and drawing with the same reference numerals, respectively. The drawing figures are not necessarily to scale and certain features may be shown exaggerated in scale in the interest of clarity and conciseness.

Referring to FIG. 1, there is illustrated a flooring system in accordance with the present invention and generally designated by the numeral 10. The flooring system 10 is adapted to be supported in a standoff position from a subfloor 12 by plural, spaced-apart elongated somewhat inverted T-shaped rails 14, see FIGS. 5 and 6 also, for example.

The rails 14 are preferably supported by spaced-apart support blocks 16, as shown in FIG. 1, one shown for each of the four rails 14 illustrated in the drawing figure. Those skilled in the art will recognize that the support blocks 16 may be spaced apart along each rail 14, as required, to provide suitable support for each rail, respectively.

The flooring system 10 further includes plural spaced-apart rows of generally rectangular shape molded plastic flooring panels 18 which are foraminous to allow animal waste to drop therethrough onto the subfloor 12 to be suitably removed therefrom. Each of the panels 18 includes spaced apart laterally projecting hooked shaped flanges 20 and 22 which are disposed on opposite sides of the panels, as shown. The side of a panel 18 which includes the flanges 20 is also provided with half length flanges, each generally designated by the numeral 21.

The opposed spaced-apart rows of panels 18 are separated by a row of cast metal flooring panels characterized by plural panels 24 supported side by side, and suitably interconnected, as will be explained in further detail herein. Panels 24 are preferably formed of cast iron, although other cast or forged metals may be used.

Figure 2:
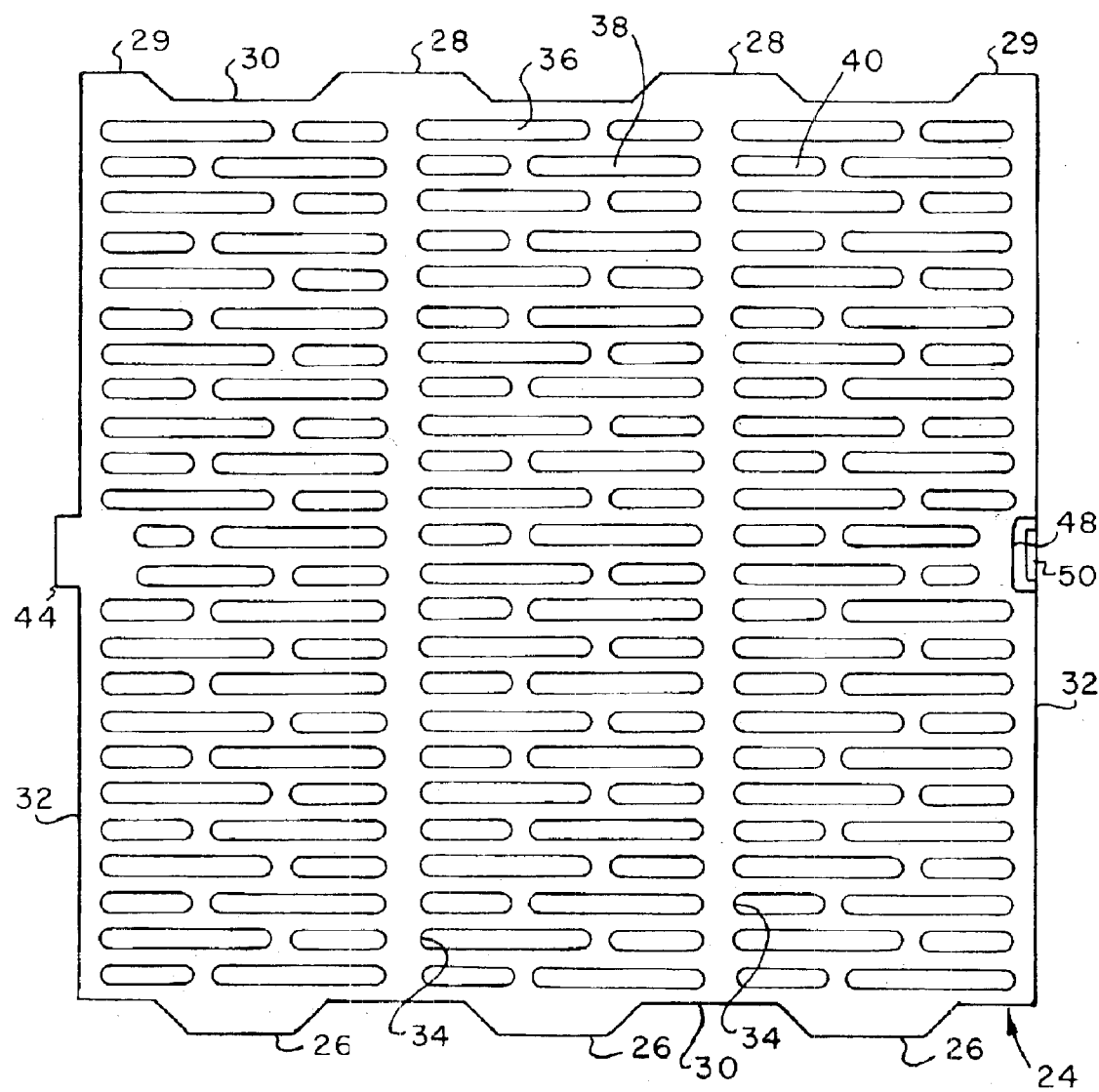
FIG. 2 is a top plan view of a cast iron or similar cast metal flooring panel in accordance with the present invention.
Figure 3:
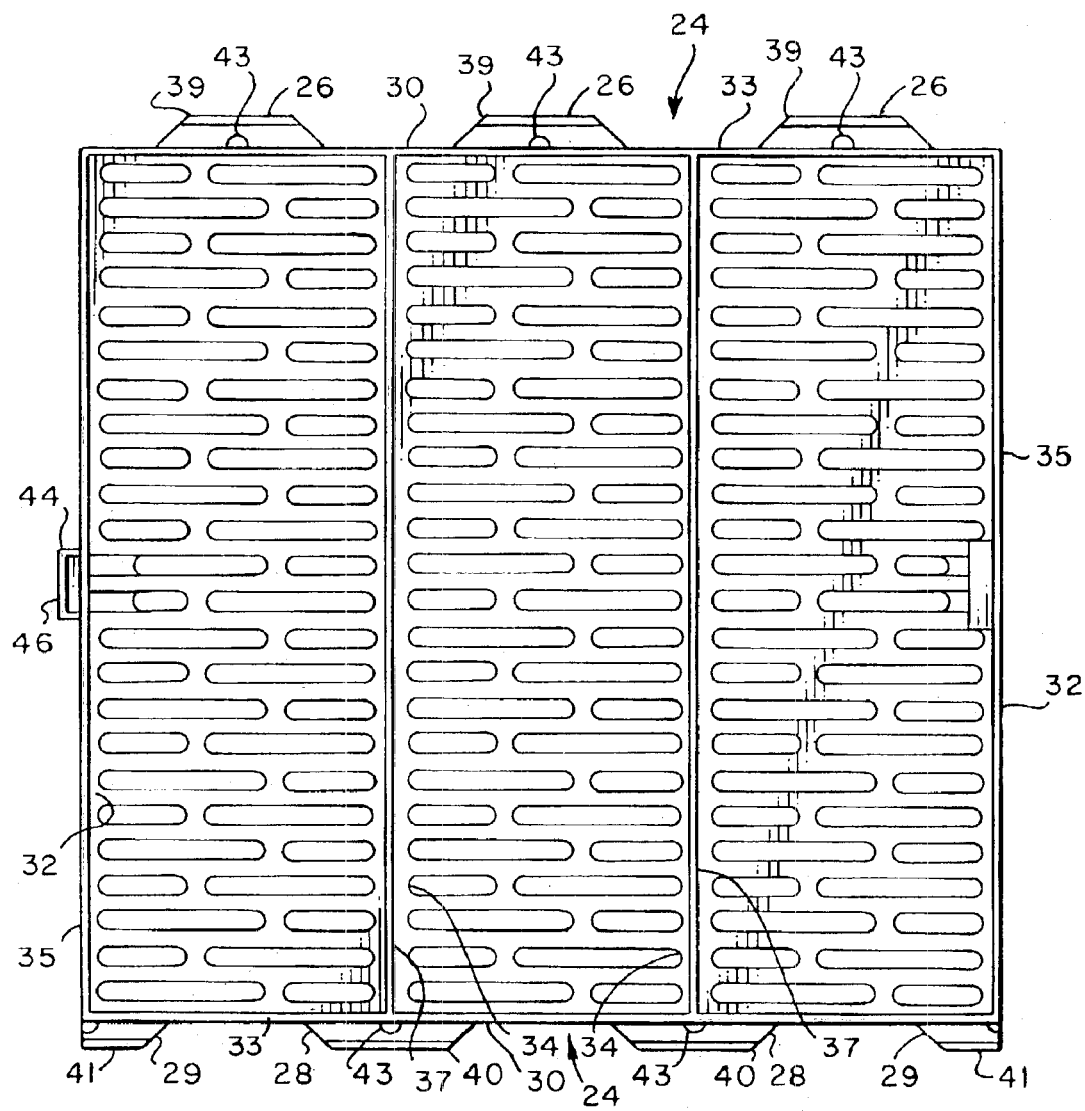
FIG. 3 is a bottom plan view of the flooring panel shown in FIG. 2.

As shown in FIGS. 2 and 3, each of the panels 24 is characterized as a generally rectangular, preferably square, member having a set of laterally projecting spaced apart hook-shaped flanges 26 disposed along one side of a panel and an opposed set of hook shaped flanges 28 suitably spaced apart on the opposite side of the panel 24. Short or half length flanges 29 are spaced from the flanges 28 on the side of the panel 24 which includes the flanges 28. As shown in FIG. 1, the spacing of the flanges 26, 28 and 29 is such that these flanges fit in cooperating recesses formed between the flanges 22 and 20 of the respective panels 18, as illustrated. The center set of panels 24 may include one or more panels 24a, one shown in FIG. 1, and of half the width of the panels 24, but otherwise identical to the panels 24. Panels 24a provide for spacing the panels 24 with respect to the panels 18 such that they overlap to provide a more rigid flooring system.

Referring further to FIG. 2, the panels 24 include a substantially foraminous support surface defined by elongated perimeter webs 30 opposed to and parallel to each other. Transverse, parallel perimeter webs 32 extend normal to the webs 30. Intermediate webs 34 are equally spaced from the webs 32 and the remainder of the surface of the panel 24 is delimited by elongated slots 36, 38 and 40, for example, to form a substantially foraminous surface to allow animal wastes to fall therethrough and to form foothold surfaces to facilitate animals arising from resting positions.

Referring to FIG. 3, which is a bottom plan view of the panel 24, it should be noted that each of the webs 30 is reinforced by a depending flange 33 and each of the webs 32 and 34 is reinforced by a similar depending flange 35 and 37, respectively. Still further, the flanges 26 are each provided with a depending hook portion 39. The opposed flanges 28 and 29 are provided with similar depending hook portions 40 and 41, respectively.

Figure 4:
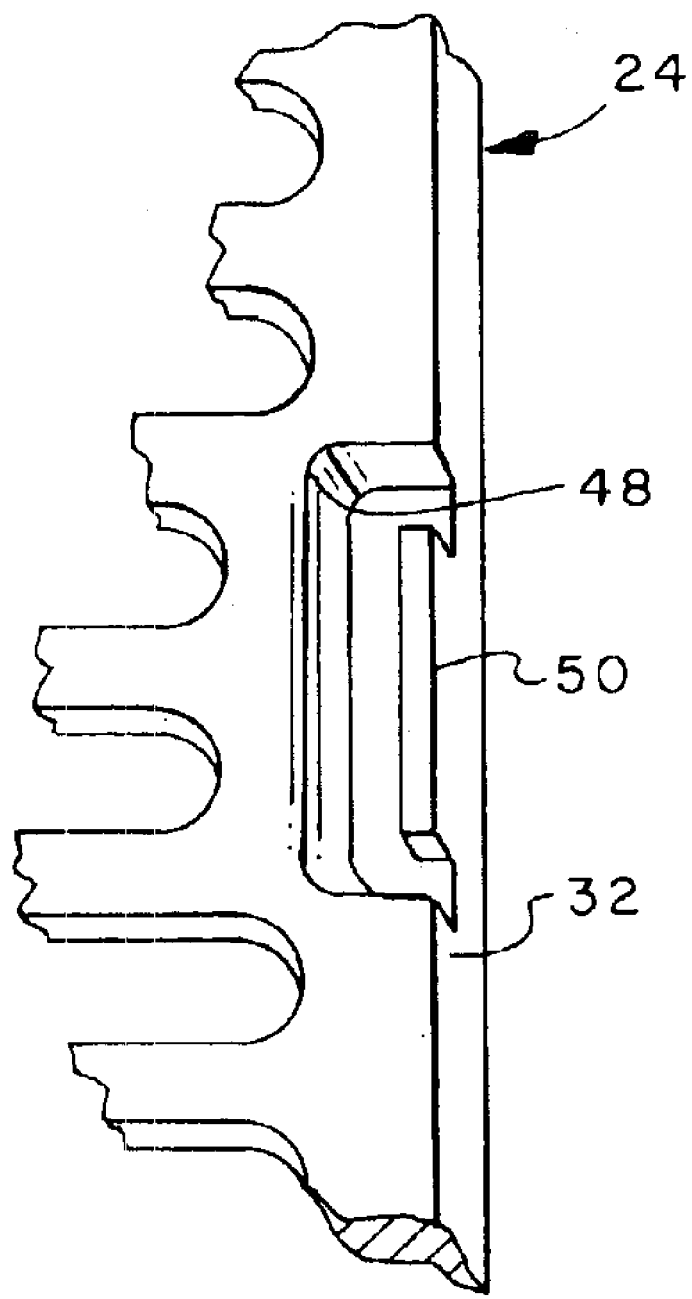
FIG. 4 is a detail view showing a recess and hook part formed on one lateral side of the flooring panel shown in FIGS. 2 and 3.
Figure 9:
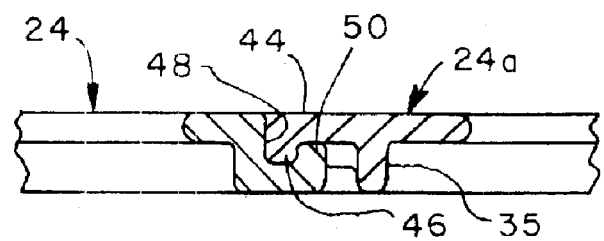
FIG. 9 is a section view taken generally along the line 9—9 of FIG. 1.

Referring further to FIGS. 2, 3 and 4 the panels 24 are each provided with means for interconnecting adjacent panels to form a more rigid flooring system, including a boss 44 projecting from a web 32 approximately midway between the opposed webs 30. Boss 44 is provided with a depending hook part 46, FIGS. 3 and 9. The opposite side edge of each panel 24 is provided with a recess 48, see FIG. 4, formed in the web 32 of that side, for receiving a portion of the boss 44 of the adjacent panel. An upstanding hook part 50, FIGS. 2 and 4, delimits one side of the recess 48 and cooperates with a hook part 46 of an adjacent panel 24 or 24a to latch adjacent panels together, as shown in FIG. 9. In this way the panels 24 and 24a are suitably supported against movement in any direction since the panels are supported on the rails 14 and are also interconnected with each other. As shown in FIG. 3, spaced-apart bosses 43 project into grooves formed by the hook shaped flanges 26, 28 and 29 to assist in locating and minimizing shifting movements of the panels 24 when they are supported on the rails 14.

Figure 5:
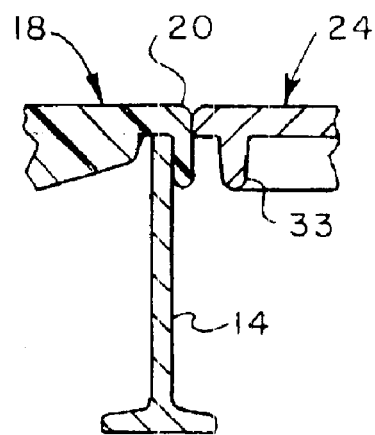
FIG. 5 is a section view taken generally along the line 5—5 of FIG. 1.
Figure 6:
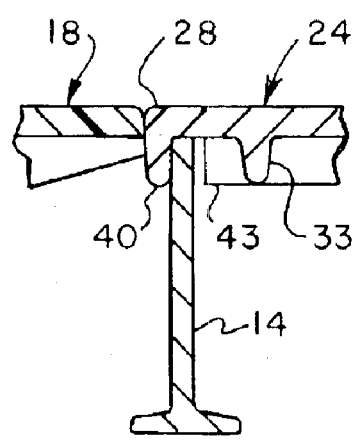
FIG. 6 is a section view taken generally along the line 6—6 of FIG. 1.

Referring briefly to FIGS. 5 and 6, these figures illustrate typical arrangements wherein the panels 18 and 24 are supported by the rails 14. As shown in FIG. 5, hook shaped flanges 20 engage a rail 14 and abut directly against a panel 24 at a recess formed by each panel 24 between its hook shaped flanges 28. In like manner, as shown in FIG. 6, each of the panels 24 is supported by a rail 14 by engagement with the rail by a hook shaped flange 28 and a cooperating boss 43. Flanges 28 project into cooperating recesses formed in panels 18 between flanges 20.

Figure 7:
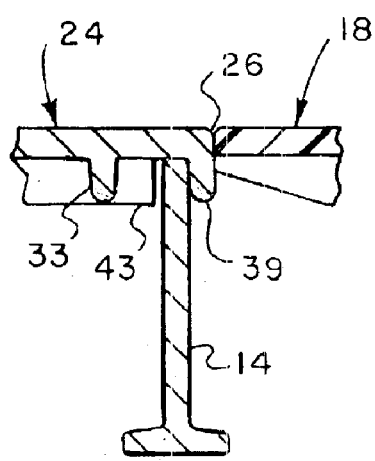
FIG. 7 is a section view taken generally along the line 7—7 of FIG. 1.
Figure 8:
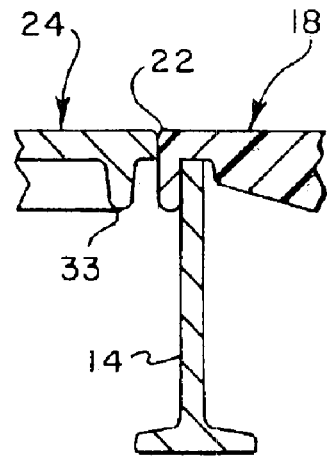
FIG. 8 is a section view taken along the line 88 of FIG. 1.

FIGS. 7 and 8 illustrate how the hook shaped flanges 26 and hook shaped flanges 22 engage respective rails 14 to support the panels 18 and 24 on the rails in the same manner as described above.

Accordingly, with the flooring system 10 arranged as illustrated and described, superior strength is provided by the interconnected and standoff supported panels 24 whereby, when the flooring system 10 is placed in a generally rectangular confinement pen, a sow will normally remain on the cast iron panels 24 due to the comfort provided to the sow thereby, while the offspring will normally remain on the molded plastic panels 18 due to the thermal conductivity characteristics of these panels and the somewhat softer or more comfortable feel that the panels present to swine offspring.

Those skilled in the art will appreciate that the flooring system 10 may be quickly and easily erected and disassembled, as needed. Thanks to the arrangement of two rows of plastic panels 18 cooperating with a center row of cast iron or similar cast metal panels 24 and 24a interposed the plastic panels and interlocked with each other as well as with the plastic panels, several advantages in the art of animal pen flooring systems are realized. The arrangement of adjacent rows of plastic and metal panels may be repeated indefinitely, although the arrangement of two rows of plastic panels and a center row of cast iron panels is preferred for each pen.

The panels 18 and 24 may be provided in various dimensions. Panels having outside dimensions of 24 inches by 24 inches are typical for use in swine farrowing houses. As mentioned above, the panels 24 above are preferably formed of cast iron and the panels 18 are preferably formed of molded plastic, such as polypropylene. The fabrication of the panels 18 and 24 may be carried out using conventional manufacturing processes for articles made of the preferred materials mentioned above. The foramina of all panels is preferably elongated slots.

Although a preferred embodiment of an animal confinement pen flooring system has been described herein in detail, those skilled in the art will recognize that various modifications and substitutions may be made to the flooring system of the present invention without departing from the scope and spirit of the appended claims.

What is claimed is:

1. A flooring system for an animal confinement pen comprising:

four, spaced apart, upstanding, elongated, parallel support rails for supporting said flooring system in a standoff position from a subfloor;

a first row of molded plastic foraminous flooring panels supported on spaced apart first and second ones of said support rails, said first row of panels including plural panels disposed side-by-side, each of said panels of said first row including on opposite sides thereof opposed sets of spaced apart hook-shaped flanges engaged with respective ones of said first and second support rails;

an intermediate row of cast metal foraminous flooring panels supported by said second one of said support rails and a third one of said support rails, said panels of said intermediate row being coplanar with said panels of said first row and said panels of said intermediate row including spaced apart hook-shaped flanges on opposite sides thereof, respectively, and engaged with said second and third support rails, respectively, said hook-shaped flanges on one side of said panels of said intermediate row being interfitted between cooperating ones of said hook-shaped flanges of said panels of said first row, respectively;

a third row of molded plastic foraminous flooring panels supported on said third one of said support rails and a fourth one of said support rails, said third row of panels including plural panels disposed side by side, each of said panels of said third row including on opposite sides thereof opposed sets of hook-shaped flanges engaged with said third and fourth support rails, respectively, one set of hook-shaped flanges of said panels of said third row being interfitted between one set of hook-shaped flanges on an opposite side of said panels of said intermediate row for interlocking said panels of said intermediate row with said panels of said third row, said panels of said third row being coplanar with said panels of said intermediate row; and said panels of said intermediate row include perimeter and intermediate webs, and plural elongated slots formed in an animal support surface of said panels of said intermediate row, respectively, between respective ones of said webs.

2. The flooring system set forth in claim 1 wherein:

each of said panels of said intermediate row include depending flanges reinforcing said webs of said panels of said intermediate row, respectively.

3. The flooring system set forth in claim 2 wherein:

each of said panels of said intermediate row is provided with spaced apart bosses projecting from selected ones of said depending flanges and disposed adjacent respective ones of said hook-shaped flanges to assist in locating and minimizing shifting movement of said panels of said intermediate row with respect to said second and third support rails, respectively.

4. The flooring system set forth in claim 1 wherein:

said panels of said intermediate row each include on one side edge a boss projecting from a web between opposed sides of said panels of said intermediate row which include said hook-shaped flanges, respectively, and including a depending hook part for disposition in a recess formed on an opposite side of an adjacent panel of said intermediate row, and a cooperating upstanding hook part delimiting one side of said recess, said hook parts being cooperable to latch adjacent panels of said intermediate row together, respectively, to prevent separation of said panels forming said flooring system.

5. The flooring system set forth in claim 1 wherein:

said panels of said intermediate row are formed of cast iron, respectively.

6. A flooring system for an animal confinement pen comprising:

four, spaced apart, upstanding, elongated, parallel support rails for supporting said flooring system in a standoff position from a subfloor;

a first row of molded plastic foraminous flooring panels supported on spaced apart first and second ones of said support rails, said first row of panels including plural panels disposed side-by-side, each of said panels of said first row including on opposite sides thereof opposed sets of spaced apart hook-shaped flanges engaged with respective ones of said first and second support rails;

an intermediate row of metal flooring panels supported by said second one of said support rails and a third one of said support rails, said panels of said intermediate row including spaced apart hook-shaped flanges on opposite sides thereof, respectively, and engaged with said second and third support rails, respectively, said hook-shaped flanges on one side of said panels of said intermediate row being interfitted between cooperating ones of said hook-shaped flanges of said panels of said first row, respectively;

a third row of molded plastic foraminous flooring panels supported on said third one of said support rails and a fourth one of said support rails, said third row of panels including plural panels disposed side by side, each of said panels of said third row including on opposite sides thereof opposed sets of hook-shaped flanges engaged with said third and fourth support rails, respectively, one set of hook-shaped flanges of said panels of said third row being interfitted between one set of hook-shaped flanges of said panels of said intermediate row for interlocking said panels of said intermediate row with said panels of said third row;

said panels of said intermediate row each include perimeter and intermediate webs, and plural elongated slots formed in an animal support surface of said panels of said intermediate row, respectively, between respective ones of said webs;

each of said panels of said intermediate row include depending flanges reinforcing said webs of said panels of said intermediate row, respectively; and each of said panels of said intermediate row is provided with spaced apart bosses projecting from selected ones of said depending flanges and disposed adjacent respective ones of said hook-shaped flanges for locating and minimizing shifting movement of said panels of said intermediate row with respect to said second and third support rails, respectively.

7. A flooring system for an animal confinement pen comprising:

four, spaced apart, upstanding, elongated, parallel support rails for supporting said flooring system in a standoff position from a subfloor;

a first row of molded plastic foraminous flooring panels supported on spaced apart first and second ones of said support rails, said first row of panels including plural panels disposed side-by-side, each of said panels of said first row including on opposite sides thereof opposed sets of spaced apart hook-shaped flanges engaged with respective ones of said first and second support rails;

an intermediate row of foraminous cast iron flooring panels supported by said second one of said support rails and a third one of said support rails, said panels of said intermediate row including spaced apart hook-shaped flanges on opposite sides thereof, respectively, and engaged with said second and third support rails, respectively, said hook-shaped flanges on one side of said panels of said intermediate row being interfitted between cooperating ones of said hook-shaped flanges of said panels of said first row, respectively; and a third row of molded plastic foraminous flooring panels supported on said third one of said support rails and a fourth one of said support rails, said third row of panels including plural panels disposed side by side, each of said panels of said third row including on opposite sides thereof opposed sets of hook-shaped flanges engaged with said third and fourth support rails, respectively, one set of hook-shaped flanges of said panels of said third row being interfitted between one set of hook-shaped flanges of said panels of said intermediate row for interlocking said panels of said intermediate row with said panels of said third row.

8. The flooring system set forth in claim 7 wherein:
each of said panels of said intermediate row is provided with spaced apart bosses projecting from respective depending flanges and disposed adjacent respective ones of said hook-shaped flanges to assist in locating and minimizing shifting movement of said panels of said intermediate row with respect to said second and third support rails, respectively.

\* \* \* \* \*